United States Patent [19]

Sekine et al.

[11] Patent Number: 4,735,492

[45] Date of Patent: Apr. 5, 1988

[54] LIQUID CRYSTAL ORIENTATION CONTROLLING FILM AND LIQUID CRYSTAL DEVICE USING THE SAME

[75] Inventors: Hiroyoshi Sekine; Hidetaka Satou, both of Hitachi; Daisuke Makino, Mito, all of Japan

[73] Assignee: Hitachi Chemical Company, Ltd., Tokyo, Japan

[21] Appl. No.: 918,494

[22] Filed: Oct. 14, 1986

[30] Foreign Application Priority Data

Oct. 14, 1985 [JP] Japan .................................. 60-228237
Nov. 29, 1985 [JP] Japan .................................. 60-270010

[51] Int. Cl.$^4$ .......................... G02F 1/13; C08G 69/36; C08G 69/26
[52] U.S. Cl. ..................................... 350/341; 350/340; 350/347 E; 528/329; 528/353
[58] Field of Search .................... 350/340, 341, 347 E; 252/174.24; 106/14.13, 14.15, 18.21, 18.24, 181; 528/353, 436, 125, 184, 185, 310, 327, 331

[56] References Cited

U.S. PATENT DOCUMENTS

| 2,398,882 | 4/1946 | Clark | 106/181 |
| 3,630,988 | 12/1971 | Deyrup | 106/18.24 X |
| 4,278,326 | 7/1981 | Kawamura et al. | 350/343 |
| 4,381,886 | 5/1983 | Yokokura et al. | 350/341 |
| 4,447,596 | 5/1984 | Makino et al. | 528/331 X |
| 4,472,027 | 9/1984 | Okubo et al. | 350/340 |
| 4,485,234 | 11/1984 | Makino et al. | 528/331 X |
| 4,593,977 | 6/1986 | Takamatsu et al. | 350/339 F |
| 4,612,049 | 9/1986 | Berner et al. | 106/14.13 |
| 4,678,283 | 7/1987 | Kreuzer et al. | 350/340 |

FOREIGN PATENT DOCUMENTS

| 2604293 | 8/1977 | Fed. Rep. of Germany | 350/341 |
| 54-133358 | 10/1979 | Japan | 350/341 |
| 57-92313 | 6/1982 | Japan | 350/341 |
| 58-88723 | 5/1983 | Japan | 350/341 |

Primary Examiner—Stanley D. Miller
Assistant Examiner—Richard F. Gallivan
Attorney, Agent, or Firm—Antonelli, Terry & Wands

[57] ABSTRACT

A liquid crystal display device containing a liquid crystal orientation controlling film made from a fluorine-containing polyimide-isoindoloquinazolinedione is high in a tilt angle and excellent in viewing properties.

7 Claims, 1 Drawing Sheet

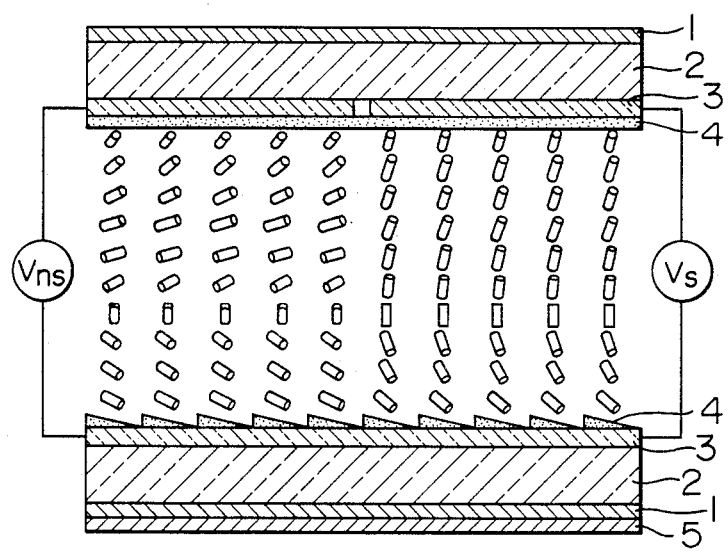

LIQUID CRYSTAL ORIENTATION CONTROLLING FILM AND LIQUID CRYSTAL DEVICE USING THE SAME

BACKGROUND OF THE INVENTION

This invention relates to a liquid crystal orientation controlling film made from a specific resin and a liquid crystal display device using such a film.

Liquid crystal display devices of the SBE system, which make use of the super-twisted birefrigence effect (T. J. Scheffer and J. Nehring: Appln. Phys. Leff. 45 (10), 1021 (1984)) are very excellent in contrast and viewing properties in comparison with conventional TN-system liquid crystal display devices.

As the orientation controlling film for such liquid crystal display devices, an inorganic oblique evaporation film made from silicon oxide or other like material has been mainly used for fulfilling the requirement to increase the pretilt angle.

Such inorganic oblique evaporation film, however, has variable selectivity over liquid crystals and is incapable of effecting good orientation of all types of liquid crystal compositions. It also had a problem that the orientation would become nonuniform under high-temperature heating in the assembling process, resulting in a low yield and poor productivity. Further, such film was unable to satisfy the contrast and viewing properties required for the orientation controlling film.

Use of polyimide-isoindoloquinazolinediones as orientation controlling film for liquid crystal display devices is disclosed, for instance, in U.S. Pat. No. 4,278,326. The liquid crystal display device using such a material as the orientation controlling film is low in the tilt angle and thus is not suitable for SBE type liquid crystal display devices.

SUMMARY OF THE INVENTION

The present invention relates to an orientation controlling film for liquid crystal display devices which is free of said problems, and a liquid crystal display device using such a film.

In accordance with this invention, there is provided an orientation controlling film for liquid crystal display devices, said film being made from a fluorine-containing polyimide-isoindoloquinazolinedione prepared by dehydration and ring closure treatment of a fluorine-containing polyamide acid obtained by reacting a carboxylic acid anhydride, a diamine and a diaminomonoamide, at least one of said three reactants having one or more fluorine atoms.

The present invention also provides a liquid crystal display device comprising a pair of substrates for holding a liquid crystal composition, electrodes provided on said substrates on the sides facing the liquid crystal composition, an orientation controlling film provided on said electrodes, said film being made from a fluorine-containing polyimide-isoindoloquinazolinedione prepared by dehydration and ring closure treatment of a fluorine-containing polyamide acid obtained by reacting a carboxylic acid anhydride, a diamine and a diaminomonoamide, at least one of said three reactants having one or more fluorine atoms, and the liquid crystal composition held between said pair of substrates having said orientation controlling films.

The present invention further provides a resin composition for forming such liquid crystal orientation controlling films.

BRIEF DESCRIPTION OF THE DRAWING

The attached drawing is a cross-sectional view showing an SBE type liquid crystal display device.

DESCRIPTION OF THE PREFERRED EMBODIMENTS

The fluorine-containing polyamide acid, which is a precursor of the fluorine-containing polyimde-isoindoloquinazolinedione used in this invention, is synthesized by reacting a carboxylic acid anhydride, a diamine and a diaminomonoamide, at least one of these reactants having at least one fluorine atom, with stirring. This reaction is conducted under an anhydrous condition, preferably at a temperature of 50° C. or below.

The ratio of said carboxylic acid anhydride, diamine and diaminomonoamide used in said reaction is selected such that, preferably, the number of moles of carboxylic acid anhydride is equal to that of a total of diamine and diaminomonoamide. The amount of diaminomonoamide is preferably in the range of 0.1 to 50% by mole based on the total amount of diamine and diaminomonoamide. Said reaction is carried out in the presence of a solvent such as dimethylacetamide, dimethylformamide, dimethylsulfoxide, N-methyl-2-pyrrolidone and the like. In the reaction of this invention, at least one of carboxylic acid anhydride, diamine and diaminomonoamide used as reactants should have one or more fluorine atoms.

The following can be cited as examples of the carboxylic acid anhydrides of the type having one or more fluorine atoms: 2,2-bis[4-(3,4-dicarboxyphenoxy)phenyl]hexafluoropropane, 2,2-bis(3,4-dicarboxyphenyl)hexafluoropropane, bis(3,4-dicarboxyphenyl)hexafluoropropane, 4,4'-bis[4-(3,4-dicarboxyphenoxy)phenyl]hexafluoropropane, (trifluoromethyl)pyromellitic acid, bis(trifluoromethyl)pyromellitic acid, 5,5'-bis(trifluoromethyl)-3,3', 4,4'-tetracarboxybiphenyl, 2,2',5,5'-tetrakis(trifluoromethyl)-3,3', 4,4'-tetracarboxybiphenyl, 5,5'-bis(trifluoromethyl)-3,3',4,4'-tetracarboxydiphenyl ether, 5,5'-bis(trifluoromethyl)-3,3', 4,4'-tetracarboxybenzophenone, bis[(trifluoromethyl)dicarboxyphenoxy]benzene, bis[(trifluoromethyl)dicarboxyphenoxy]biphenyl, bis[(trifluoromethyl)dicarboxyphenoxy]bis(trifluoromethyl)benzene, [(trifluoromethyl)dicarboxyphenoxy](trifluoromethyl)biphenyl, bis[(trifluoromethyl)dicarboxyphenoxy)diphenyl ether, bis(dicarboxyphenoxy)(trifluoromethyl)benzene, bis(dicarboxydiphenoxy)bis trifluoromethyl)benzene, bis(dicarboxyphenoxy)tetrakis(trifluoromethyl)benzene, bis(dicarboxyphenoxy)bis(trifluoromethyl)biphenyl, bis(dicarboxyphenoxy)tetrakis(trifluoromethyl)bisphenyl, 2,2-bis[4-(2,3-dicarboxybenzoyloxy)phenyl]hexafluoropropane, 2,2-bis[4-(3,4-dicarboxybenzoyloxy)-3-bromophenyl]hexafluoropropane, 2,2-bis[4-(3,4-dicarboxybenzoyloxy)3,5-dibromophenyl]hexafluoropropane, 2,2-bis[4-(3,4-dicarboxybenzoyloxy)-3,5-dimethylphenyl]hexafluoropropane, 2,2-bis[4-(3,4-dicarboxybenzoyloxy)phenyl]octafluorobutane, 2,2-bis[4-(2-trifluoromethyl-3,4-dicarboxybenzoyloxy)phenyl]hexafluoropropane, 1,3-bis[4-(3,4-dicarboxybenzoyloxy)phenyl]hexafluoropropane, 1,5-bis[4-3,4-dicarboxybenzoyloxy)phenyl]decafluoropentane, 1,6-bis[4-(3,4-dicarboxybenzoyloxy)phenyl]dodecafluorohexane, 1,7-bis[4-(3,4-dicarboxybenzoyloxy)phenyl]tetradecafluoroheptane, 1,5-bis[4-(3,4-dicarboxybenzoyloxy)-3,5-dibromophenyl]decafluoropentane, 1,5-bis[4-(3,4-dicarboxybenzoyloxy)-3,5-bistrifluoromethylphenyl]decafluoropentane, 1,5-bis[4-(2-trifluoromethyl-3,5-dicarboxybenzoyloxy)phenyl]decafluoropentane, 2,2-bis[4-(3,4-dicarboxyphenoxy)phenyl]hexafluoropropane, 2,3-[4-(2,3-dicarboxyphenoxy)phenyl]hexafluoropropane, 2,2-bis[4-(3,4-dicarboxyphenoxy)-3-bromophenyl]hexafluoropropane, 2,2-bis[4-(3,4-dicarboxyphenoxy)-3,5-dibromophenyl]hexafluoropropane, 2,2-bis[4-(3,4-dicarboxyphenoxy)-3,5-dimethylphenyl]hexafluoropropane, 2,2-bis[4-(3,4-dicarboxyphenoxy)phenyl]octafluoromethane, 2,2-bis[4-(3,4-dicarboxy-2-trifluoromethylphenoxy)phenyl]hexafluoropropane, 1,3-bis[4-(3,4-dicarboxyphenoxy)phenyl]hexafluoropropane, 1,5-bis[4-(3,4-dicarboxyphenoxy)phenyl]decafluoropentane, 1,6-bis[4-(3,4-dicarboxyphenoxy)phenyl]dodecafluorohexane, 1,7-bis[4-(3,4-dicarboxyphenoxy)phenyl]tetradecafluoropentane, 1,5-bis[4-(3,4-dicarboxyphenoxy)-3,5-dibromophenyl]decafluoropentane, 1,5-bis[4-(3,4-dicarboxyphenoxy)-3,5-bistrifluoromethylphenyl]decafluoropentane, and 1,5-bis[4-(3,4-dicarboxy2-trifluoromethylphenoxy)phenyl]decafluoropentane. These compounds may be used alone or as a mixture thereof.

Examples of the carboxylic acid anhydrides usable in this invention are pyromellitic acid anhydride, 2,3,6,7-naphthalenetetracarboxylic acid anhydride, 3,3',4,4'-diphenyltetracarboxylic acid anhydride, 1,2,5,6-naphthalenetetracarboxylic acid anhydride, 2,2',3,3'-diphenyltetracarboxylic acid anhydride, thiophene-2,3,4,5-tetracarboxylic acid anhydride, 2,2-bis(3,4-biscarboxyphenyl)propane anhydride, 3,4-dicarboxyphenylsulfone anhydride, perillene-3,4,9,10-tetracarboxylic acid anhydride, bis(3,4-dicarboxyphenyl)ether anhydrides, and 3,3',4,4'-benzophenonetetracarboxylic acid anhydride. These compounds can be used alone or as a mixture thereof.

Examples of the diamines having one or more fluorine atoms usable in this invention are: 2,2-bis[4-(4-aminophenoxy)phenyl]hexafluoropropane, 2,2-bis[4-(3-aminophenoxy)phenyl]hexafluoropropane, 2,2-bis[4-(2-aminophenoxy)phenyl]hexafluoropropane, 2,2-bis[4-(2-aminophenoxy)-3,5-dimethylphenyl]hexafluoropropane, p-bis(4-amino-2-trifluoromethylphenoxy)benzene, 4,4'-bis(4-amino-2-trifluoromethylphenoxy)biphenyl, 4,4'-bis(4-amino-3-trifluoromethylphenoxy)biphenyl, 4,4'-bis(4-amino-2-trifluoromethylphenoxy)diphenylsulfone, 4,4'- bis(3-amino-5-trifluoromethylphenoxy)diphenylsulfone, 2,2-bis[4-(4-amino-2-trifluoromethylphenoxy)phenyl]hexafluoropropane, and 4,4'-bis[(4-aminophenoxy)phenyl]hexafluoropropane.

The diamines usable in said reaction of this invention include the following: m-phenylenediamine, p-phenylenediamine, m-xylenediamine, p-xylenediamine, 4,4'-diaminodiphenyl ether, 4,4'-diaminodiphenylmethane, 3,3'-dimethyl-4,4'-diaminodiphenylmethane, 3,3',5,5'-tetramethyl-4,4'-diaminodiphenylmethane, 2,2'-bis(4-aminophenyl)propane, 4,4'-methylenedianiline, benzidine, 4,4'-diaminodiphenylsulfide, 4,4'-diaminodiphenylsulfone, 1,5-diaminonaphthalene, 3,3'-dimethylbenzidine, and 3,3'-dimethoxybenzidine.

As the diaminomonoamide of the type having one or more fluorine atoms, there can be used, for example, 4,4'-bis[(4-aminophenoxy)phenyl]hexafluoropropane-3-carbonamide.

In addition to these amines, more preferable ones are those represented by the formula:

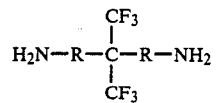

wherein R is

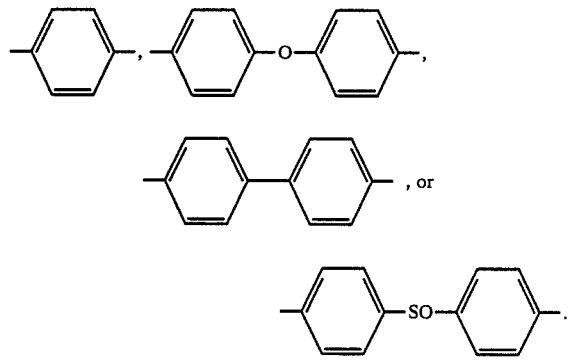

Usable as the diaminomonoamide in this invention are, for example, 1,4-diaminobenzene-2-carbonamide and 4,4'-diaminodiphenylether-3-carbonamide.

In use of said six types of compounds (a carboxylic acid anhydride having one or more fluorine atoms, a carboxylic acid anhydride, a diamine having one or more fluorine atoms, a diamine, a diaminomonoamide having one or more fluorine atoms, and a diaminomonoamide), it is possible to use two or more different compounds of each type in combination.

In the reaction of this invention, it is also possible to use a conventional diaminosiloxane represented by the formula:

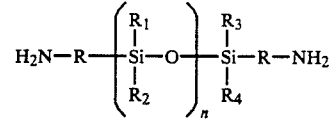

wherein R is a divalent hydrocarbon group; $R_1$, $R_2$, $R_3$ and $R_4$ are independently a monovalent hydrocarbon group; and n is an integer of 1 or greater, as an additional reactant for the purpose of improving adhesiveness to the glass substrate, metals, etc.

Coating of said polyamide acid on said substrates and electrodes can be accomplished by preparing a polyamide acid solution containing 0.01–40% by weight of the polyamide acid as a solid in a solvent such as dimethylformamide, dimethylacetamide, dimethylsulfoxide, N-methyl-2-pyrrolidone or the like, and coating this solution on said substrates and electrodes by a conventional method such as dipping, spin coating, spraying, printing, brush coating, etc.

The coating is then subjected to a heat treatment at 100°–400° C., preferably 250°–350° C. to effect dehydration and ring closure of said polyamide acid to form a fluorine-containing polyimide-isoindoloquainazodione type polymer coat. This polymer coat is further subjected to a rubbing treatment to make an orientation controlling film. The thickness of this orientation controlling film is usually 500–900 Å.

A pair of thus obtained substrates having said electrodes and orientation controlling films are placed in opposition to each other so that their respective orientation controlling films will face each other, and then they are bonded to each other in a way to form a predetermined space therebetween by interposing a spacer between them or by other means. A conventional liquid crystal composition is poured into said space and then the pouring opening is closed. In this way, a liquid crystal display device of this invention can be obtained.

The tilt angle between the orientation controlling film of this invention and the liquid crystal can be increased up to about 20°, which is amazingly high in comparison with the tilt angle of 2°–3° obtainable with the conventional high-molecular polyimide films. Therefore, the orientation controlling film of this invention can be advantageously used not only for the SBE-type liquid crystal display devices but also for the TN-type liquid crystal display devices.

The attached drawing is a cross-sectional view showing an SBE-type liquid crystal display device wherein numeral 1 denotes a polarizer, 2 a glass plate, 3 a transparent electrode, 4 an orientation controlling film, 5 a reflector, and $V_s$ means a selected operating voltage and $V_{ns}$ means a non-selected operating voltage.

As mentioned above, in accordance with this invention, by using the orientation controlling film made from a fluorine-containing polyimide-isoindoloquinazolinedione, it is possible to obtain a liquid crystal display device having excellent contrast and viewing properties with no decrease of yield in the production.

The invention will hereinafter be described more particularly by way of Examples thereof.

In the following Examples, the tilt angle was measured by the method shown in Journal of Applied Physics of Japan, Vol. 19, p. 2013 (1980).

EXAMPLE 1

0.9 mol of 2,2-bis[4-(4-aminophenoxy)phenyl]hexafluoropropane, 0.1 mol of 4,4'-diamenodiphenylether3-carbonamide and 1.0 mol of 2,2-[4-(3,4-dicarboxyphenoxy)phenyl]hexafluoropropane dianhydride were condensed in N-methyl-2-pyrrolidone at 25° C. for 5 hours and then at 80° C. for another 5 hours to obtain a fluorine-containing polyamide acid which was a precursor of a fluorine-containing polyimide-isoindoloquinazolinedione polymer. Then, an N-methyl-2-pyrrolidone solution containing 5% by wt. of said polyamide acid was spin-coated on a pair of glass substrates (3 cm×3 cm with 2 mm thick) having indium oxide electrodes thereon. After coating, said substrates were heated at 250° C. for one hour to effect dehydration and ring closure of the polyamide acid, thus forming a fluorine-containing polyimide-isoindologuinazolinedione polymer coat having a thickness of 600–800 Å.

Then said coat was subjected to rubbing in a fixed direction with gauze, and the following liquid crystal composition was filled in the space between the thus treated pair of substrates.

Liquid crystal composition:

| | |
|---|---|
| ZLT-2293 (mfd. by Merck & Co., Inc.) | 100 parts by weight |
| CB-15 (dextral chiral agent, mfd. by BDH Inc.) | 3.07 parts by weight |
| S-811 (sinistral chiral agent, mfd. by Merck & Co., Inc.) | 3.33 parts by weight |

The thus obtained liquid crystal display device had a thickness of about 6.3 μm. The tilt angle was 4.9°.

A voltage was applied to this device and its rise-up characteristics and contrast were examined. Both were excellent.

EXAMPLE 2

By following the process of Example 1 but by using a 5 wt% N-methyl-2-pyrrolidone solution of polyamide acid obtained by condensing 0.8 mol of 2,2-bis[4-(4-aminophenoxy)phenyl]hexafluoropropane, 0.2 mol of 4,4'-diaminodiphenylether-3-carbonamide and 1.0 mol of 3,3', 4,4'-biphenyltetracarboxylic acid dianhydride in N-methyl-2-pyrrolidone at 25° C. for 6 hours and then at 80° C. for additional 6 hours, there was obtained a liquid crystal display device showing the same good properties as those in Example 1. The tilt angle of this device was 5.3°.

COMPARATIVE EXAMPLE 1

A polyamide acid was prepared in the same manner as described in Example 1 except for condensing 0.1 mole of 4,4'-diaminodiphenyl ether-3-carbonamide, 0.9 mole of 4,4'-diaminodiphenyl ether, 0.6 mole of pyromellitic dianhydride, and 0.4 mole of 3,3', 4,4'-benzophenonetetracarboxylic dianhydride in N-methyl-2-pyrrolidone at 25° C. for 6 hours and at 80° C. for 7 hours. The thus obtained polyamide acid was dissolved in N-methyl-2-pyrrolidone so as to give a solution containing 5% by weight of thus obtained polyamide acid for coating.

After coating in the same manner as described in Example 1, the dehydration and ring closure was conducted at 350° C. for 1 hour to form a polyimideisoindoloquinazolinedione film with 600 to 800 Å thick.

A liquid crystal display device was prepared in the same manner as described in Example 1 including the rubbing treatment. The device had a tilt angle of 2.0°.

This device was insufficient in properties for applying to the SBE type.

What is claimed is:

1. An orientation controlling film for liquid crystal display devices, said film being made from a fluorine-containing polyimide-isoindoloquinazolinedione prepared by dehydration and ring closure treatment of a fluorine-containing polyamide acid obtained by reacting a carboxylic acid anhydride, a diamine and a diaminomonoamide, at least one of said three reactants having one or more fluorine atoms.

2. An orientation controlling film according to claim 1, wherein the diamine is a compound represented by the formula:

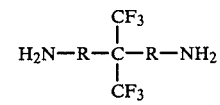

wherein R is

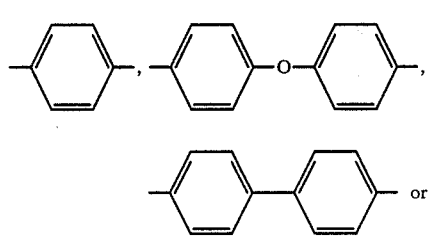

-continued

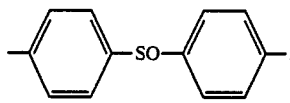

3. An orientation controlling film according to claim 1, wherein the carboxylic acid anhydride has one or more fluorine atoms.

4. An orientation controlling film according to claim 1, wherein the carboxylic acid anhydride has one or more fluorine atoms and the diamine has one or more fluorine atoms.

5. A liquid crystal display device comprising a pair of substrates for holding a liquid crystal composition, electrodes provided on said substrates on the sides facing the liquid crystal composition, an orientation controlling film made from a fluorine-containing polyimideisoindoloquinazolinedione prepared by dehydration and ring closure treatment of a flourine-containing polyamide acid obtained by reacting a carboxylic acid anhydride, a diamine and a diaminomonoamide, at least one of said three reactants having one or more fluorine atoms, and the liquid crystal composition held between said pair of substrates provided with said orientation controlling films.

6. A device according to claim 5, which is an SBE type.

7. A composition for forming an orientation controlling film used in a liquid crystal display device comprising a fluorine-containing polyamide acid obtained by reacting a carboxylic acid anhydride, a diamine and a diaminomonoamide, at least one of the carboxylic acid anhydride, the diamine and the diaminomonoamide having one or more fluorine atoms.

* * * * *